United States Patent
Yoshida et al.

(10) Patent No.: US 8,013,053 B2
(45) Date of Patent: Sep. 6, 2011

(54) WATER-BASED INKS FOR INK-JET PRINTING

(75) Inventors: Hiroyuki Yoshida, Wakayama (JP); Isao Tsuru, Wakayama (JP); Ryuma Mizushima, Wakayama (JP)

(73) Assignee: Kao Corporation, Tokyo (JP)

( * ) Notice: Subject to any disclaimer, the term of this patent is extended or adjusted under 35 U.S.C. 154(b) by 143 days.

(21) Appl. No.: 11/645,648

(22) Filed: Dec. 27, 2006

(65) Prior Publication Data

US 2007/0149647 A1 Jun. 28, 2007

(30) Foreign Application Priority Data

Dec. 27, 2005 (JP) ................................. 2005-376606

(51) Int. Cl.
*C08F 290/06* (2006.01)
*C08F 290/04* (2006.01)
*C08L 33/06* (2006.01)
*C04B 35/634* (2006.01)
*C08G 73/10* (2006.01)
*C08K 9/00* (2006.01)
*C09D 11/00* (2006.01)

(52) U.S. Cl. ........ 524/558; 524/376; 524/504; 524/560; 524/561; 523/160; 523/161; 523/200; 523/205

(58) Field of Classification Search .................. 523/160, 523/161, 200, 205; 106/31.27, 31.47, 31.58, 106/31.6, 31.86, 31.87; 524/376, 504, 560, 524/561

See application file for complete search history.

(56) References Cited

U.S. PATENT DOCUMENTS

| 5,688,311 | A | * | 11/1997 | Adamic .................. 106/31.86 |
| 6,086,661 | A | * | 7/2000 | Malhotra et al. ............ 106/31.43 |
| 6,498,202 | B1 | * | 12/2002 | Sun et al. ..................... 523/160 |
| 2001/0023265 | A1 | * | 9/2001 | Hidaka et al. ................. 523/161 |
| 2002/0016385 | A1 | | 2/2002 | Nakano et al. |
| 2003/0097961 | A1 | * | 5/2003 | Yatake et al. .............. 106/31.59 |
| 2003/0144377 | A1 | * | 7/2003 | Sano et al. ..................... 523/160 |
| 2005/0104947 | A1 | * | 5/2005 | Ogino et al. .................. 347/105 |
| 2008/0192098 | A1 | * | 8/2008 | Tsuru et al. ................... 347/100 |

FOREIGN PATENT DOCUMENTS

| EP | 1029904 A1 | | 8/2000 |
| EP | 1295916 A1 | | 3/2003 |
| EP | 1323789 A1 | | 7/2003 |
| EP | 1609829 A1 | | 12/2005 |
| JP | 2006-176692 | * | 7/2006 |
| WO | WO 2006/038727 | * | 4/2006 |
| WO | WO 2006038726 | * | 4/2006 |

OTHER PUBLICATIONS

STN Search Report pp. 1-2.*
English language translation of JP 2006-176692 pp. 1-20.*
Chinese Application No. 200610156773.4; Translation of Chinese Office Action, Aug. 11, 2010; 8 pages.

* cited by examiner

*Primary Examiner* — Patrick Joseph Ryan
*Assistant Examiner* — Alexander C Kollias
(74) *Attorney, Agent, or Firm* — Birch, Stewart, Kolasch & Birch, LLP

(57) ABSTRACT

The present invention relates to a water-based ink for ink-jet printing which exhibits a high optical density even upon one-pass printing on plain papers and is suitable for high-speed printing, and a dispersion used in the water-base ink. There are provided a water dispersion for ink-jet printing, including water-insoluble polymer particles containing a colorant, and a nonionic organic compound satisfying the following conditions I and II:

I: Water containing 0.001% by weight of the nonionic organic compound has a surface tension of 70 mN/m or less as measured at 25° C.; and
  II: A solubility of the nonionic organic compound in 100 g of water is 0.30 g or less as measured at 25° C., a water-based ink containing the water dispersion, and a method of conducting a one-pass printing using the water-based ink.

5 Claims, 2 Drawing Sheets

WATER-BASED INKS FOR INK-JET PRINTING

FIELD OF THE INVENTION

The present invention relates to water-based inks for ink-jet printing, water dispersions used in the water-based inks, and an ink-jet printing method using the water-based inks.

BACKGROUND OF INVENTION

In ink-jet printing methods, droplets of ink are directly projected onto a recording medium from very fine nozzles and allowed to adhere to the recording medium, to form characters and image. The ink-jet printing methods have been rapidly spread because of their various advantages such as easiness of full coloration, low costs, capability of using plain paper as the recording medium, non-contact with printed images and characters, etc.

As to the ink-jet printing methods, for example, WO 01/096483 discloses an ink for ink-jet printing which contains a colorant formed by coating a pigment and/or a dye with a polymer, water, and at least one compound selected from the group consisting of an acetylene glycol-based surfactant, an acetylene alcohol-based surfactant, a glycol ether and a 1,2-alkylene glycol, and exhibits excellent dispersion stability and ejection stability, and capable of providing images which are free from bleeding and excellent in color developability and rubbing resistance.

JP 2003-096345A discloses a pigment-containing ink for ink-jet printing which is composed of a polymer emulsion containing polymer fine particles into which a water-insoluble or hardly-soluble colorant is included, and which also contains at least one wetting agent selected from the group consisting of glycerol, 1,3-butanediol, triethylene glycol, 1,6-hexanediol, propylene glycol, 1,5-pentanediol, diethylene glycol, dipropylene glycol, trimethylol propane and trimethylol ethane, and further contains at least a polyol or a glycol ether having 8 to 11 carbon atoms, an anionic or nonionic surfactant, a water-soluble organic solvent and water, wherein the ink has a viscosity of 5 mPa·s or more as measured at 25° C., is excellent in ejection stability, storage stability, and is capable of obtaining printed images having good quality and fastness even upon high-speed printing on plain papers.

However, the above conventional water-based inks are still unsatisfactory in optical density upon one-pass printing on plain papers.

SUMMARY OF THE INVENTION

The present invention relates to the following aspects (i) to (iv):

(i) A water dispersion for ink-jet printing, including water-insoluble polymer particles containing a colorant, and a nonionic organic compound satisfying the following conditions I and II:

I: Water containing 0.001% by weight of the nonionic organic compound has a surface tension of 70 mN/m or less as measured at 25° C.; and II: A solubility of the nonionic organic compound in 100 g of water is 0.30 g or less as measured at 25° C.

(ii) A water dispersion for ink-jet printing, including water-insoluble polymer particles containing a colorant, and at least one nonionic organic compound selected from the group consisting of the following compounds (1) to (3):

(1) an alkane diol compound having 8 to 30 carbon atoms and containing hydroxyl groups respectively bonded to adjacent carbon atoms thereof;

(2) a fatty acid monoglyceride having 8 to 30 carbon atoms; and (3) a monoalkyl glyceryl ether having 8 to 30 carbon atoms.

(iii) A water-based ink for ink-jet printing, including the water dispersion as described in the above aspect (i) or (ii).

(iv) An ink-jet printing method of conducting an one-pass printing using the water-based ink as described in the above aspect (iii).

DETAILED DESCRIPTION OF THE INVENTION

Figure 1:
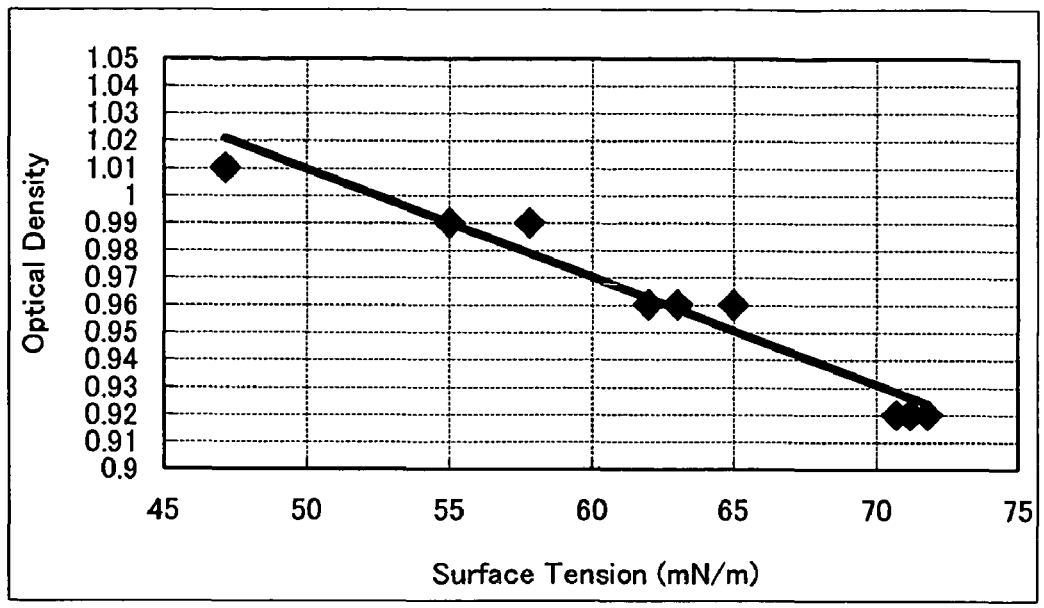
FIG. 1 is a view showing a relationship between an optical density of the water-based inks obtained in Examples 1 to 7 and Comparative Examples 1 to 3 and a surface tension of water containing 0.001% by weight of the nonionic organic compound as measured at 25° C.

The present invention relates to a water-based ink for ink-jet printing which exhibits a high optical density upon one-pass printing on plain papers, an excellent gloss upon printing on coated papers, and is suitable for high-speed printing; a dispersion used in the ink.

In the ink-jet printing methods, in order to achieve a high optical density even upon high-speed printing, a colorant is required to remain on a surface of a printing paper and spread thereover. The inventors have found that when a wettability and a spreadability of the water-based ink over the surface of the printing paper are promoted to prevent the ink from penetrating into the paper, the colorant can remain on the surface of the printing paper and spread thereover.

Also, the inventors have found that in order to solve the above problem, it is effective to use a specific nonionic organic compound capable of exhibiting a low solubility in water and lowering a surface tension of the ink even when used in a very small amount.

In the first preferred embodiment of the present invention, there are provided a water dispersion for ink-jet printing which includes water-insoluble polymer particles containing a colorant, and a nonionic organic compound satisfying the following conditions I and II:

I: Water containing 0.001% by weight of the nonionic organic compound has a surface tension of 70 mN/m or less as measured at 25° C.; and II: A solubility of the nonionic organic compound in 100 g of water is 0.30 g or less as measured at 25° C., and a water-based ink containing the water dispersion.

The respective components are explained below.

(Nonionic Organic Compound)

The nonionic organic compound used in the present invention has the effect of promoting a wettability and a spreadability of the water-based ink on a printing paper and therefore prevents the ink from penetrating to an inside of the paper.

The nonionic organic compound preferably contains, in addition to a saturated or unsaturated linear or branched hydrocarbon group having 8 to 30 carbon atoms, at least one substituent group selected from the group consisting of a hydroxyl group, an ester group, an ether group, a carbonyl group and an amido group. However, the saturated or unsaturated linear or branched hydrocarbon group having 8 to 30 carbon atoms is not divided into parts by the substituent group such as an ester group, an ether group, a carbonyl group and an amido group. Also, when the substituent group is bonded to the hydrocarbon group, the carbon atoms of the ester group, carbonyl group and amido group may constitute a part of the carbon atoms of the hydrocarbon group having 8 to 30 carbon atoms. On the other hand, the nonionic organic compound preferably contains no salt-forming group such as a carboxyl group, a sulfonic group, a phosphoric group, an amino group and an ammonium group to prevent the resultant dispersion or ink from being foamed.

The nonionic organic compound is preferably a compound having 2 or more hydroxyl groups (polyol compound), more preferably 2 to 6 hydroxyl groups, still more preferably 2 or 3 hydroxyl groups and further still more preferably 2 hydroxyl groups.

The nonionic organic compound contains a saturated or unsaturated hydrocarbon group having 8 to 30 carbon atoms, and the saturated or unsaturated hydrocarbon group preferably has 8 to 22 carbon atoms, more preferably 10 to 22 carbon atoms, still more preferably 10 to 18 carbon atoms and most preferably 12 to 18 carbon atoms. The hydrocarbon group may be either saturated or unsaturated, and may also be linear or branched.

More specifically, the nonionic organic compound is preferably at least one compound selected from the group consisting of the following compounds (1) to (3):

(1) A linear or branched alkane, alkene or alkyne polyol having 8 to 30 carbon atoms. Examples of the polyol (1) include linear or branched alkane, alkene or alkyne diol or triol having 8 to 30 carbon atoms whose hydroxyl groups may be bonded to any positions thereof.

(2) An ester or ether compound containing a linear or branched alkyl or alkenyl group having 8 to 30 carbon atoms. Examples of the ester or ether compound (2) include ester compounds of a linear or branched carboxylic acid having 8 to 30 carbon atoms and a monohydric or polyhydric alcohol, and ether compounds of a linear or branched alcohol having 8 to 30 carbon atoms and a monohydric or polyhydric alcohol.

(3) An ester or ether compound containing a linear or branched alkylene or alkenylene group having 8 to 30 carbon atoms. Examples of the ester or ether compound (3) include diester compounds of a linear or branched α,ω-dicarboxylic acid having 8 to 30 carbon atoms and a monohydric or polyhydric alcohol, and ether or diether compounds of a linear or branched α,ω-diol having 8 to 30 carbon atoms and a monohydric or polyhydric alcohol.

Examples of the monohydric alcohol used in the compound (2) or (3) include those alcohols having 1 to 6 carbon atoms such as ethanol, isopropyl alcohol, butanol and pentanol. Examples of the polyhydric alcohol used in the compound (2) or (3) include glycerols such as mono- or polyglycerols; glycols such as ethylene glycol; and sugars such as glucose and sorbitol. Among these compounds, preferred are polyhydric alcohols.

In view of a high optical density of the resultant dispersion or ink, the nonionic organic compound preferably has a molecular weight of 100 or more and more preferably 200 or more. The upper limit of the molecular weight of the nonionic organic compound is preferably 3000 or less, more preferably 2000 or less, still more preferably 1000 or less and most preferably 500 or less. From the above viewpoints, the molecular weight of the nonionic organic compound is preferably from 100 to 3,000, more preferably from 100 to 2,000, still more preferably from 100 to 1,000, further still more preferably from 200 to 1000 and most preferably from 200 to 500.

Meanwhile, when the solubility of the nonionic organic compound in water is less than 0.001% by weight, the surface tension thereof is measured at a maximum solubility of the nonionic organic compound in water.

The surface tension of water containing 0.001% by weight of the nonionic organic compound (solution prepared by adding 0.001 g of the nonionic organic compound in 100 g of water) as measured at 25° C. is 70 mN/m or less, preferably 67 mN/m or less, more preferably 62 mN/m or less, still more preferably 53 mN/m or less and further still more preferably 50 mN/m or less. The lower limit of the surface tension is not particularly limited, and is preferably 40 mN/m or more in view of a high optical density.

As is recognized from FIG. 1 showing a relationship between an optical density of the water-based ink and a surface tension of water containing 0.001% by weight of the nonionic organic compound as measured at 25° C., as the surface tension of water containing the nonionic organic compound is lowered, the optical density of the water-based ink containing the nonionic organic compound is increased.

The solubility of the nonionic organic compound in 100 g of water as measured at 25° C. is 0.30 g or less, preferably 0.25 g or less, more preferably 0.15 g or less, still more preferably 0.10 g or less, further still more preferably 0.05 g or less and most preferably 0.01 g or less in view of a high optical density. The lower limit of solubility of the nonionic organic compound in 100 g of water is not particularly limited, and is preferably 0.00001 g or more.

Figure 2:
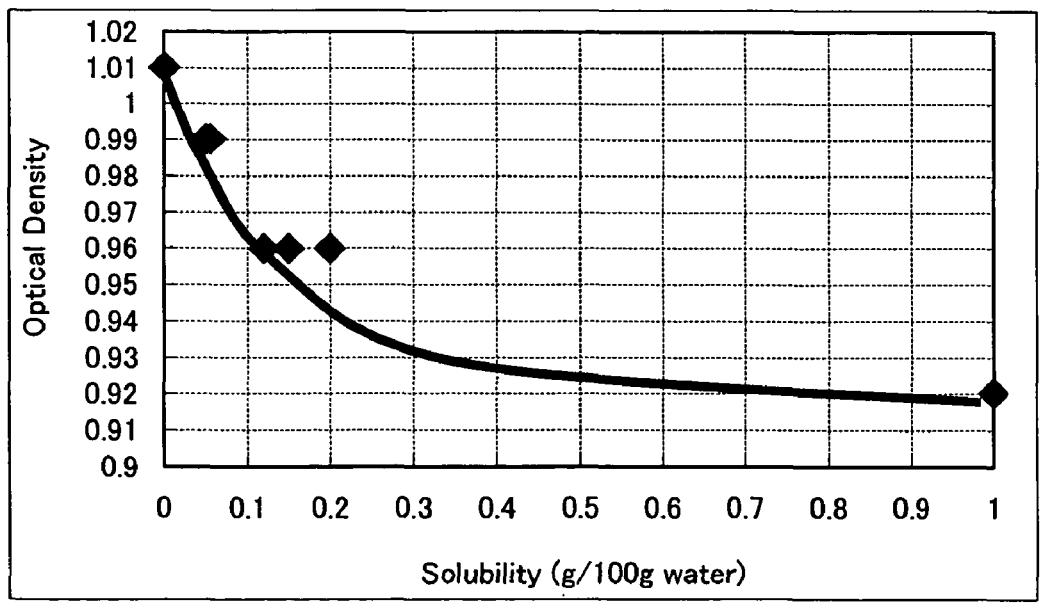
FIG. 2 is a view showing a relationship between an optical density of the water-based inks obtained in Examples 1 to 7 and Comparative Example 2 and a solubility of the nonionic organic compound in 100 g of water as measured at 25° C.

Also, as is recognized from FIG. 2 showing a relationship between an optical density of the water-based inks and a solubility of the nonionic organic compound in 100 g of water as measured at 25° C., when the solubility of the nonionic organic compound in 100 g of water as measured at 25° C. is 0.30 g or less, the water-based ink containing the nonionic organic compound is remarkably enhanced in optical density.

The nonionic organic compound used in the present invention may be added with an ethyleneoxide group and/or a propyleneoxide group unless the addition of these groups to the nonionic organic compound adversely affects the effects of the present invention.

More specifically, the nonionic organic compound is preferably at least one compound selected from the group consisting of [1] an alkane, alkene or alkyne diol having 8 to 30 carbon atoms, [2] a fatty acid monoglyceride having 8 to 30 carbon atoms, and [3] a monoalkyl glyceryl ether having 8 to 30 carbon atoms.

[1] Alkane, Alkene or Alkyne Diol Compound Having 8 to 30 Carbon Atoms:

The alkane, alkene or alkyne diol compound having 8 to 30 carbon atoms preferably contains hydroxyl groups respectively bonded to adjacent carbon atoms thereof. In view of a high optical density, the total number of carbon atoms contained in the alkane, alkene or alkyne diol compound is preferably from 8 to 22, more preferably from 10 to 22, still more preferably from 10 to 18 and most preferably from 12 to 18.

Specific examples of the alkane, alkene or alkyne diol having 8 to 30 carbon atoms include 1,2-octanediol, 1,2-decanediol, 1,2-dodecanediol, 1,2-tetradecanediol, 1,2-hexadecanediol, 1,2-octadecanediol, 1,2-eicosanediol and 1,2-docosanediol. These diol compounds may be either linear or branched.

Among these compounds, preferred diols (and surface tension thereof) are, for example, 1,2-octanediol (65 mN/m), 1,2-decanediol (55 mN/m) and 1,2-dodecanediol (47.1 mN/m).

Also, as to the solubility of these compounds in 100 g of water as measured at 25° C., for example, the solubility values of 1,2-octanediol, 1,2-decanediol and 1,2-dodecanediol are 0.20 g, 0.055 g and 0.001 g, respectively.

[2] Fatty Acid Monoglyceride Having 8 to 30 Carbon Atoms:

In the fatty acid monoglyceride having 8 to 30 carbon atoms, the number of carbon atoms in a fatty acid moiety thereof is preferably from 8 to 22, more preferably from 10 to 22, still more preferably from 12 to 22 and most preferably from 12 to 18 in view of a high optical density and a good anti-foaming property. The fatty acid may be either linear or branched, and is preferably linear. Also, the fatty acid may be either saturated or unsaturated. In addition, the fatty acid monoglyceride may be in the form of either 1-fatty acid monoglyceride or 2-fatty acid monoglyceride. In the present invention, the fatty acid monoglyceride used herein means a 1-fatty acid monoglyceride unless otherwise specified. Specific examples of the fatty acid monoglyceride include monoesters of at least one fatty acid selected from the group consisting of octanoic acid, 2-ethylhexanoic acid, decanoic acid, isodecanoic acid, lauric acid, myristic acid, palmitic acid, oleic acid, stearic acid, isostearic acid and behenic acid with a glycerol.

Among these compounds, preferred fatty acid monoglycerides (and surface tension thereof) are, for example, decanoic acid monoglyceride (65 mN/m) and lauric acid monoglyceride (63 mN/m).

Also, as to the solubility of these compounds in 100 g of water as measured at 25° C., for example, the solubility values of decanoic acid monoglyceride and lauric acid monoglyceride are 0.01 g and 0.005 g, respectively.

[3] Monoalkyl Glyceryl Ether Having 8 to 30 Carbon Atoms:

In the monoalkyl glyceryl ether having 8 to 30 carbon atoms, the number of carbon atoms in an alkyl group contained therein is preferably from 8 to 22, more preferably from 10 to 22, still more preferably from 12 to 22 and most preferably from 12 to 18. The alkyl group may be either linear or branched, and is preferably linear. The bonding position of the alkyl group to the monoalkyl glyceryl ether may be either the 1-position (1-alkyl glyceryl ether) or the 2-position (2-alkyl glyceryl ether). In the present invention, the alkyl glyceryl ether used herein means the 1-alkyl glyceryl ether unless otherwise specified. Specific examples of the monoalkyl glyceryl ether include at least one compound selected from the group consisting of octyl glyceryl ether, 2-ethylhexyl glyceryl ether, decyl glyceryl ether, isodecyl glyceryl ether, dodecyl glyceryl ether, myristyl glyceryl ether, stearyl glyceryl ether, isostearyl glyceryl ether and behenyl glyceryl ether.

Among these compounds, preferred monoalkyl glyceryl ethers (and surface tension thereof) are, for example, 2-ethylhexyl glyceryl ether (62 mN/m) and isodecyl glyceryl ether (57.8 mN/m).

Also, as to the solubility of these compounds in 100 g of water as measured at 25° C., for example, the solubility values of 2-ethylhexyl glyceryl ether and isodecyl glyceryl ether are 0.15 g and 0.05 g, respectively.

In the second preferred embodiment of the present invention, there are provided the water dispersion for ink-jet printing containing colorant-containing water-insoluble polymer particles and at least one nonionic organic compound selected from the group consisting of the following compounds (1) to (3), and the water-based ink containing the water dispersion.

(1) an alkane diol compound having 8 to 30 carbon atoms and containing hydroxyl groups respectively bonded to adjacent carbon atoms thereof;

(2) a fatty acid monoglyceride having 8 to 30 carbon atoms; and (3) a monoalkyl glyceryl ether having 8 to 30 carbon atoms.

Examples of the alkane diol compound (1) having 8 to 30 carbon atoms and containing hydroxyl groups respectively bonded to adjacent carbon atoms thereof, the fatty acid monoglyceride (2) having 8 to 30 carbon atoms, and the monoalkyl glyceryl ether (3) having 8 to 30 carbon atoms are the same as those described above for the nonionic organic compounds [1] to [3]. The preferred ranges and preferred compounds are also the same as those for the nonionic organic compounds [1] to [3].

In view of good optical density, the nonionic organic compound used in the first and second preferred embodiment of the present invention are made of a compound capable of allowing a pigment to exhibit an average penetration depth (penetrating of pigment) of preferably 65 μm or less, more preferably 60 μm or less, still more preferably 55 μm or less and still much more preferably 51 μm or less as measured by the below-mentioned standard test method. Also, in view of good rubbing resistance, the nonionic organic compound used in the present invention are preferably made of a compound capable of allowing a pigment to exhibit an average penetration depth (penetration of pigment) of preferably 10 μm or more and more preferably 20 μm or more as measured by the below-mentioned standard test method. In consequence, from these viewpoints as a whole, the average penetration depth of the pigment is preferably from 10 to 65 μm, more preferably from 10 to 60 μm and much more preferably from 20 to 55 μm Colorant The colorant used in the present invention may be either hydrophobic dye or pigment. Also, the hydrophobic dye and pigment may be combined with each other at an optional ratio. Among these colorants, to meet the recent strong demand for a high weather resistance, preferred is the pigment.

The pigment may be either organic or inorganic. The organic or inorganic pigment may be used in combination with an extender pigment, if required.

Examples of the organic pigments include azo pigments, disazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include C.I. Pigment Yellow 13, 17, 74, 83, 97, 109, 110, 120, 128, 139, 151, 154, 155, 174, 180; C.I. Pigment Red 48, 57:1, 122, 146, 176, 184, 185, 188, 202; C.I. Pigment Violet 19, 23; C.I. Pigment Blue 15, 15:1, 15:2, 15:3, 15:4, 16, 60; and C.I. Pigment Green 7, 36.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the extender pigment include silica, calcium carbonate and talc.

The hydrophobic dyes are preferably used as dyes since they are capable of being included in the water-insoluble polymer. Examples of the hydrophobic dyes include oil dyes and disperse dyes. To allow the dye to efficiently become included in the water-insoluble polymer, the solubility of the hydrophobic dye in an organic solvent is preferably 2 g/L or more and more preferably from 20 to 500 g/L as measured at 25° C. on the basis of the organic solvent used for dissolving the hydrophobic dye upon production of the water dispersion.

Examples of the oil dyes include C.I. Solvent Black 3, 7, 27, 29, 34, 45; C.I. Solvent Yellow 14, 16, 29, 56, 82, 83:1; C.I. Solvent Red 1, 3, 8, 18, 24, 27, 43, 49, 51, 72, 73; C.I. Solvent Violet 3; C.I. Solvent Blue 2, 4, 11, 44, 64, 70; C.I. Solvent Green 3, 7; and C.I. Solvent Orange 2.

Examples of commercially available oil dyes include "Nubian Black PC-0850" oil dye, "Oil Black HBB" oil dye, "Oil Black 860" oil dye, "Oil Yellow 129" oil dye, "Oil Yellow 105" oil dye, "Oil Pink 312" oil dye, "Oil Red 5B" oil dye, "Oil Scarlet 308" oil dye, "Vali Fast Blue 2606" oil dye and "Oil Blue BOS" oil dye (tradenames) all available from Orient Kagaku Co., Ltd.; and "Neopen Yellow 075" oil dye, "Neopen Mazenta SE1378" oil dye, "Neopen Blue 808" oil dye, "Neopen Blue 807" oil dye, "Neopen Blue FF4012" oil dye and "Neopen Cyan FF4238" oil dye (tradenames) all available from BASF AG.

Examples of the disperse dyes include C.I. Disperse Yellow 5, 42, 54, 64, 79, 82, 83, 93, 99, 100, 119, 122, 124, 126, 160, 184:1, 186, 198, 199, 204, 224, 237; C.I. Disperse Orange 13, 29, 31:1, 33, 49, 54, 55, 66, 73, 118, 119, 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, 368; and C.I. Disperse Green 6:1, 9. Among these dyes, preferred are C.I. Solvent Yellow 29 and 30 for yellow colorant, C.I. Solvent Blue 70 for cyan colorant, C.I. Solvent Red 18 and 49 for magenta colorant, and C.I. Solvent Black 3 and 7 and nigrosine black dyes for black colorant.

To enhance the dispersion stability and optical density, the content of the colorant in the water dispersion and water-based ink of the present invention is preferably from 1 to 20% by weight and more preferably from 3 to 10% by weight.

To enhance the optical density, the amounts of the water-insoluble polymer and the colorant used in the present invention are adjusted such that the weight ratio of the colorant to the water-insoluble polymer [colorant/water-insoluble polymer] is preferably from 50/50 to 90/10, more preferably from 50/50 to 80/20 and still more preferably from 55/45 to 78/22.

Water-Insoluble Polymer

The water dispersion and the water-based ink according to the present invention are preferably obtained by using a water dispersion containing water-insoluble polymer particles in which the colorant is included or incorporated, in view of attaining excellent rubbing resistance, low viscosity and excellent ejecting property.

Examples of the water-insoluble polymer forming the water-insoluble polymer particles include water-insoluble vinyl polymers, water-insoluble ester-based polymers and water-insoluble urethane-based polymers. Among these water-insoluble polymers, preferred are water-insoluble vinyl polymers in view of a good stability of the resultant water dispersion. The term "water-insoluble polymer" used herein means such a polymer which is dissolved at 25° C. in 100 g of water in an amount of 10 g or less, preferably 5 g or less and more preferably 1 g or less after dried at 105° C. for 2 h. When the water-insoluble polymer contains a salt-forming group, the above amount of the water-insoluble polymer dissolved in water is measured after the salt-forming group is neutralized 100% with acetic acid or sodium hydroxide according to the kind of salt-forming group to be neutralized.

In view of good gloss of the resultant printed images, the water-insoluble polymer used in the present invention preferably contains a constitutional unit represented by the following formula (1):

In the general formula (1), $R^1$ is a hydrogen atom or a methyl group, and $R^2$ is a substituted or unsubstituted arylalkyl group having 7 to 22 carbon atoms, preferably 7 to 18 carbon atoms and more preferably 7 to 12 carbon atoms, or a substituted or unsubstituted aryl group having 6 to 22 carbon atoms, preferably 6 to 18 carbon atoms and more preferably 6 to 12 carbon atoms. The substituent group which may be bonded to $R^2$ may contain a hetero atom. Examples of the hetero atom include a nitrogen atom, an oxygen atom and a sulfur atom.

Specific examples of $R^2$ include a benzyl group, a phenethyl (phenylethyl) group, a phenoxyethyl group, a diphenylmethyl group and a trityl group.

Specific examples of the substituent group which may be bonded to $R^2$ include an alkyl, alkoxy or acyloxy group having preferably 1 to 9 carbon atoms, a hydroxyl group, an ether group, an ester group and a nitro group.

The constitutional unit represented by the general formula (1) is especially preferably those constitutional units derived from benzyl (meth)acrylate in view of a high gloss of the resultant printed images.

The constitutional unit represented by the formula (1) is preferably produced by polymerizing a monomer represented by the following formula (1-1):

$$CH_2=CR^1COOR^2 \qquad (1\text{-}1)$$

wherein $R^1$ and $R^2$ are the same as defined above.

More specifically, a polymer containing the constitutional unit represented by the formula (1) may be produced by polymerizing a monomer such as phenyl(meth)acrylate, benzyl(meth)acrylate, 2-phenylethyl (meth)acrylate, phenoxyethyl(meth)acrylate, 1-naphthalyl acrylate, 2-naphthalyl (meth)acrylate, phthalimidemethyl(meth)acrylate, p-nitrophenyl(meth)acrylate, 2-hydroxy-3-phenoxypropyl (meth)acrylate, 2-methacryloyloxyethyl-2-hydroxypropyl phthalate and 2-acryloyloxyethyl phthalic acid. Among these monomers, especially preferred is benzyl (meth)acrylate. These monomers may be used alone or in the form of a mixture of any two or more thereof.

Meanwhile, the term "(meth)acrylate" used herein means an "acrylate", a "methacrylate" or a mixture thereof.

The water-insoluble vinyl polymer used in the present invention preferably further contains the constitutional unit represented by the following formula (2):

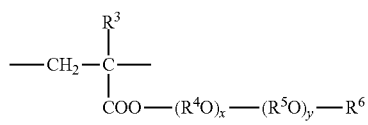
(2)

In the above general formula (2), $R^3$ represents a hydrogen atom or a methyl group, and $R^4O$ is an oxypropylene group. $R^4O$ may include —CH(CH$_3$)CH$_2$O— in addition to —CH$_2$CH(CH$_3$)O—. $R^5O$ represents an oxyalkylene group having 2 or 4 carbon atoms. Among these oxyalkylene groups, preferred is an oxyethylene group or an oxytetramethylene group.

$R^6$ represents a hydrogen atom, an alkyl group having 1 to 20 carbon atoms or a phenyl group which may be substituted with an alkyl group having 1 to 9 carbon atoms. From the standpoints of a high optical density and a good storage stability of the resultant ink, among these groups, preferred are alkyl groups having 1 to 12 carbon atoms, and more preferred are alkyl groups having 1 to 8 carbon atoms, and also preferred are phenyl groups which may be substituted with an alkyl group having 1 to 8. Examples of the alkyl group having 1 to 8 carbon atoms include methyl, ethyl, propyl, isopropyl, butyl, t-butyl, hexyl, octyl and 2-ethylhexyl.

$R^4O$ and $R^5O$ may be either random-added or block-added. When $R^4O$ and $R^5O$ are block-added, the structure may be in the form of either —COO—$(R^4O)_x$—$(R^5O)_y$—$R^6$ or —COO—$(R^5O)_y$—$(R^4O)_x$—$R^6$.

The suffixes x and y represent average molar numbers of addition where x is a number from 1 to 30, preferably from 2 to 30, more preferably from 3 to 20 and still more preferably from 3 to 15, and y is a number from 0 to 30, preferably from 0 to 20 and more preferably from 0 to 15. If y is 2 or more, a plurality of the $R^5O$ groups may be the same or different.

The constitutional unit represented by the general formula (2) is preferably produced by polymerizing a monomer represented by the following general formula (2-1):

$$CH_2=CR^3COO—(R^4O)_x—(R^5O)_y—R^6 \quad (2\text{-}1)$$

wherein $R^3$, $R^4O$, $R^5O$, $R^6$, x and y are the same as defined above.

Among those constitutional units represented by above general formula (2), the constitutional units represented by the following general formula (3) or (4) are preferred in view of a high optical density of the resultant dispersion or ink. Further, the water-insoluble polymer used in the present invention may contain both constitutional units represented by the following general formulae (3) and (4).

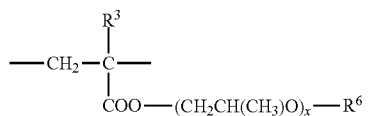
(3)

wherein $R^3$, x and $R^6$ are the same as defined above.

The constitutional unit represented by the general formula (3) corresponds to the constitutional unit represented by the general formula (2) in which y is 0.

The constitutional unit represented by the general formula (3) is preferably produced by polymerizing a monomer represented by the following general formula (3-1):

$$CH_2=CR^3COO—(CH_2CH(CH_3)O)_x—R^6 \quad (3\text{-}1)$$

wherein $R^3$, $R^6$ and x are the same as defined above.

Specific examples of the monomer represented by the general formula (3-1) include polypropylene glycol mono(meth)acrylate, methoxy polypropylene glycol mono(meth)acrylate, ethoxy polypropylene glycol mono(meth)acrylate, octoxy polypropylene glycol mono(meth)acrylate, stearoxy polypropylene glycol mono(meth)acrylate, nonylphenoxy polypropylene glycol mono(meth)acrylate and phenoxy polypropylene glycol mono(meth)acrylate. Among these monomers, especially preferred is polypropylene glycol mono(meth)acrylate. These monomers may be used alone or in the form of a mixture of any two or more thereof.

The constitutional unit represented by the following general formula (4) corresponds to the constitutional unit represented by the general formula (2) in which y is 1 or more.

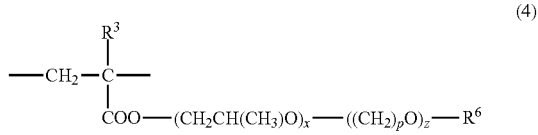
(4)

wherein $R^3$, $R^6$ and x are the same as defined above; p is a number of 2 or 4; z represents an average molar number of addition, and is a number from 1 to 30, preferably from 2 to 20 and more preferably from 3 to 15; and (CH$_2$CH(CH$_3$)O) and ((CH$_2$)$_p$O) are random-added or block-added, and when being block-added, the structure may be in the form of either —COO—(CH$_2$CH(CH$_3$)O)$_x$—((CH$_2$)$_p$O)$_z$—$R^6$ or —COO—((CH$_2$)$_p$O)$_z$—(CH$_2$CH(CH$_3$)O)$_x$—$R^6$.

The constitutional unit represented by the general formula (4) is preferably produced by polymerizing a monomer represented by the following general formula (4-1) or (4-2):

$$CH_2=CR^3COO—(CH_2CH(CH_3)O)_x—(CH_2CH_2O)_z—R^6 \quad (4\text{-}1);$$ or $$CH_2=CR^3COO—(CH_2CH(CH_3)O)_x—((CH_2)_4O)_z—R^6 \quad (4\text{-}2),$$

wherein $R^3$, $R^6$, x and z are the same as defined above; (CH$_2$CH(CH$_3$)O) and (CH$_2$CH$_2$O) as well as (CH$_2$CH(CH$_3$)O) and ((CH$_2$)$_4$O) are random-added or block-added, and when being block-added, the structures may be in the form of either CH$_2$=CR$^3$COO—(CH$_2$CH(CH$_3$)O)$_x$—(CH$_2$CH$_2$O)$_z$—$R^6$ or CH$_2$=CR$^3$COO—(CH$_2$CH$_2$O)$_z$—(CH$_2$CH(CH$_3$)O)$_x$—$R^6$, or either CH$_2$=CR$^3$COO—(CH$_2$CH(CH$_3$)O)$_x$—((CH$_2$)$_4$O)$_z$—$R^6$ or CH$_2$=CR$^3$COO—((CH$_2$)$_4$O)$_z$—(CH$_2$CH(CH$_3$)O)$_x$—$R^6$.

Specific examples of the monomers represented by the general formulae (4-1) and (4-2) include ethylene glycol/propylene glycol (meth)acrylate, poly(ethylene glycol/propylene glycol) mono(meth)acrylate [in which ethylene glycol and propylene glycol are randomly bonded], octoxy polyethylene glycol/polypropylene glycol mono(meth)acrylate [in which polyethylene glycol and polypropylene glycol are block-bonded, and the polyethylene glycol and polypropylene glycol may be successively block-bonded from the side of the (meth)acrylic group, or vice versa; this definition is similarly applied to the below-mentioned compounds], octoxy poly(ethylene glycol/propylene glycol) mono(meth)acrylate, stearoxy polyethylene glycol/polypropylene glycol mono(meth)acrylate, stearoxy poly(ethylene glycol/propylene glycol) mono(meth)acrylate, phenoxy polyethylene glycol/polypropylene glycol mono(meth)acrylate, phenoxy poly(ethylene glycol/propylene glycol) mono(meth)acrylate, nonylphenoxy polyethylene glycol/polypropylene glycol mono(meth)acrylate, nonylphenoxy poly(ethylene glycol/propylene glycol) mono(meth)acrylate, and poly(propylene glycol/tetramethylene glycol) mono(meth)acrylate. Among these monomers, especially preferred are poly(ethylene glycol/propylene glycol) mono(meth)acrylate and poly(propylene glycol/tetramethylene glycol) mono(meth)acrylate. These monomers may be used alone or in the form of a mixture of any two or more thereof.

Specific examples of commercially available products of the monomer represented by the general formula (2-1) include polyfunctional acrylate monomers (NK Esters) M-40G, M-90G and M-230G all available from Shin-Nakamura Kagaku Kogyo Co., Ltd.; and BLEMMER Series PE-90, PE-200, PE-350, PME-100, PME-200, PME-400, PME-1000, PP-500, PP-800, PP-1000, AP-150, AP-400, AP-550, AP-800, 50PEP-300, 50PPT-800 and 50POEP-800B all available from NOF Corporation.

In the water-insoluble vinyl polymer used in the present invention, the weight ratio of the constitutional unit represented by the general formula (1) to the constitutional unit represented by the general formula (2) [constitutional unit represented by the general formula (1)/constitutional unit represented by the general formula (2)] in the polymer is preferably in the range of from 1/2 to 10/1, more preferably from 1/2 to 8/1, still more preferably from 1/2 to 5/1 and most preferably from 1/1 to 5/1 in view of achieving both a high optical density and a good gloss as well as a high fixing property.

The water-insoluble vinyl polymer used in the present invention preferably further contains a constitutional unit derived from a salt-forming group-containing monomer (a) in view of enhancing a dispersibility of the polymer. Examples of the salt-forming group include anionic groups such as a carboxyl group, a sulfonic group and a phosphoric group, and cationic groups such as an amino group and an ammonium group. The constitutional unit derived from the salt-forming group-containing monomer (a) can be produced by polymerizing a salt-forming group-containing monomer. Alternatively, after completion of the polymerization, salt-forming groups such as anionic groups and cationic groups may be introduced into the resultant polymer chain.

Examples of the preferred salt-forming group-containing monomer (a) include an anionic monomer (a-1) and a cationic monomer (a-2).

As the anionic monomer (a-1), there may be used at least one compound selected from the group consisting of unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid.

Examples of the unsaturated sulfonic acid monomers include styrenesulfonic acid, 2-acrylamido-2-methylpropanesulfonic acid, 3-sulfopropyl(meth)acrylate and bis(3-sulfopropyl)itaconate.

Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, preferred are the unsaturated carboxylic acid monomers in view of a suitable viscosity and a good ejecting property of the resultant ink, and more preferred are acrylic acid and methacrylic acid.

As the cationic monomer (a-2), there may be used at least one compound selected from the group consisting of unsaturated tertiary amine-containing vinyl monomers and unsaturated ammonium salt-containing vinyl monomers.

Examples of the unsaturated tertiary amine-containing vinyl monomers include N,N-dimethylaminoethyl(meth)acrylate, N,N-dimethylaminopropyl(meth)acrylate, N,N-diethylaminoethyl (meth)acrylate, N,N-dimethylaminopropyl (meth)acrylamide, vinyl pyrrolidone, 2-vinyl pyridine, 4-vinyl pyridine, 2-methyl-6-vinyl pyridine and 5-ethyl-2-vinyl pyridine.

Examples of the unsaturated ammonium salt-containing vinyl monomers include quaternary ammonium compounds derived from N,N-dimethylaminoethyl(meth)acrylate, quaternary ammonium compounds derived from N,N-diethylaminoethyl(meth)acrylate, and quaternary ammonium compounds derived from N,N-dimethylaminopropyl (meth)acrylate.

Among the above cationic monomers, preferred are N,N-dimethylaminoethyl(meth)acrylate, N,N-dimethylaminopropyl (meth)acrylamide and vinyl pyrrolidone.

These salt-forming group-containing monomers (a) may be used alone or in the form of a mixture of any two or more thereof.

The water-insoluble polymer preferably contains the constitutional unit represented by the above general formula (1) and further the constitutional unit represented by the above general formula (2) in order to allow the resultant dispersion or ink to exhibit sufficient optical density and dispersion stability. In particular, the water-insoluble polymer is preferably a water-insoluble graft polymer which includes a polymer containing the constitutional unit represented by the above general formula (1) and/or the constitutional unit represented by the above general formula (2), and the constitutional unit derived from the salt-forming group-containing monomer (a) in a main chain thereof, and a polymer containing a constitutional unit derived from a macromer (b) in a side chain thereof.

Examples of the macromer as the component (b) include the below-mentioned styrene-based macromers (b-1), alkyl (meth)acrylate-based macromers (b-2), aromatic ring-containing (meth)acrylate-based macromers (b-3) and silicone-based macromers (b-4).

The component (b) is used to enhance an optical density, a dispersion stability of the colorant-containing water-insoluble polymer fine particles, etc., and may be such a macromer which is a monomer containing a polymerizable functional group such as an unsaturated group at one terminal end thereof and having a number-average molecular weight of 500 to 100,000 and preferably 1,000 to 10,000.

Meanwhile, the number-average molecular weight of the component (b) may be measured by gel permeation chromatography using polystyrene as a standard substance and using tetrahydrofuran containing 50 mmol/L of acetic acid as a solvent.

Styrene-Based Macromer (b-1):

The styrene-based macromer means a macromer containing a constitutional unit derived from the styrene-based monomer (hereinafter occasionally referred to merely as a "monomer (b-1)") such as styrene, α-methyl styrene and vinyl toluene. Among these styrene-based monomers, preferred is styrene.

Examples of the styrene-based macromer include styrene homopolymers having a polymerizable functional group at one terminal end thereof, and copolymers of styrene with the other monomer which have a polymerizable functional group at one terminal end thereof. The polymerizable functional group bonded to the one terminal end is preferably an acryloyloxy group or a methacryloyloxy group. When these functional groups are copolymerized with the other components, it is possible to produce the water-insoluble graft polymer containing the constitutional unit derived from the styrene-based macromer.

Examples of the other monomer copolymerizable with styrene include acrylonitrile, the below-mentioned (meth) acrylates (hereinafter occasionally referred to merely as the "monomer (b-2)"), and aromatic ring-containing (meth)acrylate-based monomers other than styrene (hereinafter occasionally referred to merely as the "monomer (b-3)").

The content of the constitutional unit derived from the styrene-based monomer in the side chain or the styrene-based macromer is preferably 60% by weight or more, more preferably 70% by weight or more and still more preferably 90% by weight or more in view of a good rubbing resistance.

The styrene-based macromer is commercially available, for example, from Toagosei Co., Ltd., as product names of AS-6, AS-6S, AN-6, AN-6S, HS-6, HS-6S, etc.

Alkyl(Meth)Acrylate-Based Macromer (b-2)

The alkyl(meth)acrylate-based macromer means such a macromer which contains a constitutional unit derived from the (meth)acrylate (hereinafter referred to merely as the "monomer (b-2)") containing an alkyl group having 1 to 22 carbon atoms and preferably 1 to 18 carbon atoms which may also contain a hydroxyl group.

Specific examples of the (meth)acrylate include methyl (meth)acrylate, ethyl(meth)acrylate, (iso)propyl(meth)acrylate, 2-hydroxyethyl (meth)acrylate, (iso- or tertiary-)butyl (meth)acrylate, 2-ethylhexyl (meth)acrylate, (iso)octyl (meth)acrylate, (iso)decyl(meth)acrylate and (iso)stearyl (meth)acrylate.

The side chain containing the constitutional unit derived from the monomer (b-2) may be produced by copolymerizing the alkyl(meth)acrylate-based macromer having a polymerizable functional group at one terminal end thereof. Examples of the alkyl(meth)acrylate-based macromer include a methyl methacrylate-based macromer, a butyl acrylate-based macromer, an isobutyl methacrylate-based macromer and a lauryl methacrylate-based macromer.

These alkyl(meth)acrylate-based macromers may be homopolymers of the alkyl(meth)acrylate having a polymerizable functional group at one terminal end thereof, or copolymers of the alkyl(meth)acrylate with the other monomer which have a polymerizable functional group at one terminal end thereof. The polymerizable functional group bonded to one terminal end is preferably an acryloyloxy group or a methacryloyloxy group. Examples of the other monomer copolymerizable with the alkyl(meth)acrylate include the above-mentioned styrene-based monomers (monomers (b-1)) and the below-mentioned aromatic ring-containing (meth)acrylate-based monomers other than styrene (monomer (b-3)).

In the side chain or the alkyl(meth)acrylate macromer, the content of the constitutional unit derived from the (meth) acrylate is largest, and preferably 60% by weight or more, more preferably 70% by weight or more and still more preferably 90% by weight or more in view of a good rubbing resistance.

Aromatic Ring-Containing (Meth)Acrylate-Based Macromer (b-3)

The aromatic ring-containing (meth)acrylate-based macromer means such a macromer containing a constitutional unit derived from the aromatic ring-containing (meth)acrylate as the monomer (b-3). The aromatic ring-containing (meth)acrylate is preferably a monomer represented by the above formula (1-1):

$$CH_2=CR^1COOR^2 \qquad (1\text{-}1)$$

wherein $R^1$ and $R^2$ are respectively the same as defined above.

Specific examples of the aromatic ring-containing (meth) acrylate include benzyl(meth)acrylate, phenyl(meth)acrylate, 2-phenylethyl (meth)acrylate, phenoxyethyl(meth)acrylate, 1-naphthyl acrylate, 2-naphthyl(meth)acrylate, phthalimidomethyl(meth)acrylate, p-nitrophenyl (meth) acrylate, 2-hydroxy-3-phenoxypropyl(meth)acrylate, 2-methacryloyloxyethyl-2-hydroxypropyl phthalate and 2-acryloyloxyethyl phthalate. Among these the aromatic ring-containing (meth)acrylates, especially preferred is benzyl(meth)acrylate. These the aromatic ring-containing (meth) acrylates may be used alone or in combination of any two or more thereof.

The side chain containing the constitutional unit derived from the aromatic ring-containing (meth)acrylate may be produced by copolymerizing the aromatic ring-containing (meth)acrylate-based macromer having a polymerizable functional group at one terminal end thereof.

Examples of the aromatic ring-containing (meth)acrylate-based macromer include homopolymers of the aromatic ring-containing (meth)acrylate having a polymerizable functional group at one terminal end thereof, and copolymers of the aromatic ring-containing (meth)acrylate with the other monomer which have a polymerizable functional group at one terminal end thereof. The polymerizable functional group bonded to one terminal end of the macromer is preferably an acryloyloxy group or a methacryloyloxy group. Examples of the other monomer copolymerizable with the aromatic ring-containing (meth)acrylate include (1) the above-mentioned styrene-based monomers as the monomer (b-1) and (2) the (meth)acrylates as the monomer (b-2).

In the side chain or the aromatic ring-containing (meth) acrylate-based macromer, the constitutional unit derived from the aromatic ring-containing (meth)acrylate has a largest content.

Silicone-Based Macromer (b-4)

The water-insoluble graft polymer used in the present invention may further contain an organopolysiloxane chain as the side chain thereof. Such a side chain is preferably produced, for example, by copolymerizing a silicone-based macromer having a polymerizable functional group at one terminal end thereof which is represented by the following formula (5):

$$CH_2=C(CH_3)-COOC_3H_6-[Si(CH_3)_2-O]_t-Si(CH_3)_3 \qquad (5)$$

wherein t is a number of 8 to 40.

When the polymer used in the present invention is the water-insoluble graft polymer, the weight ratio of a main chain of the polymer to a side chain thereof [main chain/side chain] is preferably from 1/1 to 20/1, more preferably from 3/2 to 15/1 and still more preferably from 2/1 to 10/1 in view of enhancing a dispersion stability. Meanwhile, the weight ratio is calculated assuming that the polymerizable functional group is contained in the side chain.

Among the above macromers, the styrene-based macromers having a polymerizable functional group at one terminal end thereof are preferred in view of a high affinity to the colorant and an enhanced dispersion stability.

Meanwhile, the terms "(iso- or tertiary-)" and "(iso)" used herein mean both the case where the branched structure expressed by "iso" or "tertiary" is present, and the case where such a branched structure is not present (namely, "normal").

The water-insoluble polymer preferably further contains a constitutional unit derived from a hydrophobic monomer (c) in view of enhancing a dispersion stability, an optical density and a high lighter-fastness.

The constitutional unit derived from the hydrophobic monomer (c) can be produced by polymerizing a hydrophobic monomer. Alternatively, after completion of the polymerization, the hydrophobic monomer may be introduced into the resultant polymer chain.

The hydrophobic monomer (c) is preferably (c-1) a (meth)acrylate containing an alkyl group having 1 to 22 carbon atoms, or (c-2) a monomer represented by the following general formula (6):

$$CH_2=C(R^7)-R^8 \qquad (6)$$

wherein $R^7$ is a hydrogen atom or an alkyl group having 1 to 5 carbon atoms; and $R^8$ is an aromatic ring-containing hydrocarbon group having 6 to 22 carbon atoms.

Examples of the (meth)acrylate (c-1) containing an alkyl group having 1 to 22 carbon atoms include methyl(meth)acrylate, ethyl(meth)acrylate, (iso)propyl(meth)acrylate, (iso- or tertiary-)butyl(meth)acrylate, 2-ethylhexyl(meth)acrylate, (iso)octyl(meth)acrylate, (iso)decyl (meth)acrylate, (iso)dodecyl(meth)acrylate, (iso)stearyl(meth)acrylate and behenyl(meth)acrylate.

As the monomer (c-2) represented by the above general formula (6), in view of a good optical density, there is preferably used at least one monomer selected from the group consisting of styrene, vinyl naphthalene, α-methyl styrene, vinyl toluene, ethylvinyl benzene, 4-vinyl biphenyl and 1,1-diphenyl ethylene. Among these monomers, at least one styrene-based monomer selected from the group consisting of styrene, α-methyl styrene and vinyl toluene is preferred in view of a good optical density and a good storage stability of the resultant dispersion or ink.

The water-insoluble polymer used in the present invention may further contain other constitutional units.

The water-insoluble polymer used in the present invention preferably contains the constitutional unit represented by the above formula (1) and further the constitutional unit represented by the above formula (2). The water-insoluble polymer is preferably produced by copolymerizing a monomer mixture containing the monomer represented by the above formula (1-1) and the monomer represented by the above formula (2-1) as well as the salt-forming group-containing monomer (a), the macromer (b) and/or the hydrophobic monomer (c) (hereinafter referred to merely as a "monomer mixture").

The content of the monomer represented by the formula (1-1) in the monomer mixture or the content of the constitutional unit represented by the general formula (1) in the water-insoluble polymer is 10% by weight or more, preferably from 10 to 80% by weight, more preferably from 20 to 80% by weight and still more preferably from 25 to 75% by weight in view of enhancing an optical density and a gloss of the resultant water-based ink as well as good fixing property and dispersion stability thereof.

The content of the monomer represented by the general formula (2-1) in the monomer mixture or the content of the constitutional unit represented by the general formula (2) in the water-insoluble polymer is preferably from 5 to 60% by weight, more preferably from 8 to 55% by weight and still more preferably from 10 to 50% by weight in view of enhancing an optical density and a gloss of the resultant water-based ink as well as good fixing property and dispersion stability thereof.

The content of the salt-forming group-containing monomer (a) in the monomer mixture (hereinafter, it shall be calculated as a non-neutralized amount of a salt-forming group-containing monomer) or the content of the constitutional unit derived from the salt-forming group-containing monomer (a) in the water-insoluble polymer is preferably from 3 to 30% by weight, more preferably from 5 to 25% by weight and still more preferably from 5 to 20% by weight in view of enhancing an optical density and a gloss of the resultant water-based ink as well as a good dispersion stability thereof.

The weight ratio [(1)/(a)] of the constitutional unit represented by the general formula (1) to the constitutional unit derived from the salt-forming group-containing monomer (a) is preferably from 10/1 to 1/1 and more preferably from 8/1 to 2/1 in view of enhancing a dispersion stability of the water-insoluble polymer and a gloss of the resultant water-based ink.

The weight ratio [(2)/(a)] of the constitutional unit represented by the general formula (2) to the constitutional unit derived from the salt-forming group-containing monomer (a) is preferably from 10/1 to 1/1 and more preferably from 5/1 to 1/1 in view of enhancing a dispersion stability of the water-insoluble polymer and an optical density of the resultant water-based ink.

The content of the macromer (b) in the monomer mixture, or the content of the constitutional unit derived from the macromer (b) in the water-insoluble polymer is preferably from 0 to 40% by weight, more preferably from 5 to 35% by weight and still more preferably from 5 to 30% by weight in view of a good optical density of the resultant water-based ink.

The content of the hydrophobic monomer (c) in the monomer mixture, or the content of the constitutional unit derived from the hydrophobic monomer (c) in the water-insoluble polymer is preferably 0 to 40% by weight and more preferably 0 to 20% by weight in view of a good optical density and a good dispersion stability of the resultant water-based ink.

In the present invention, the water-insoluble polymer containing a constitutional unit derived from the salt-forming group-containing monomer is used after neutralizing the salt-forming group with the below-mentioned neutralizing agent. The degree of neutralization of the salt-forming group is preferably from 10 to 200%, more preferably from 20 to 150% and still more preferably from 50 to 150%.

When the salt-forming group is an anionic group, the degree of neutralization is calculated according to the following formula:

{[weight (g) of neutralizing agent/equivalent of neutralizing agent]/[acid value of polymer (KOH mg/g)×weight (g) of polymer/(56×1,000)]}×100

When the salt-forming group is a cationic group, the degree of neutralization is calculated according to the following formula:

{[weight (g) of neutralizing agent/equivalent of neutralizing agent]/[amine value of polymer (HCl mg/g)×weight (g) of polymer/(36.5×1,000)]}×100

The acid value or amine value may be calculated from the respective constitutional units of the water-insoluble polymer, or may also be determined by the method of subjecting a solution prepared by dissolving the polymer in an appropriate solvent such as methyl ethyl ketone to titration.

The weight-average molecular weight of the water-insoluble polymer used in the present invention is preferably from 5,000 to 500,000, more preferably from 10,000 to 400,000 and still more preferably from 10,000 to 300,000 in view of a good dispersion stability of the colorant as well as a good water resistance and a good ejection property of the resultant ink.

Meanwhile, the weight-average molecular weight of the water-insoluble polymer may be measured by gel permeation chromatography using dimethylformamide containing 60 mmol/L of phosphoric acid and 50 mmol/L of lithium bromide as a solvent and using polystyrene as a standard substance.

Colorant-Containing Water-Insoluble Polymer Particles

The water dispersion of the colorant-containing water-insoluble polymer particles is preferably produced through the following steps (1) and (2):

Step (1): Dispersing a mixture containing the water-insoluble polymer, organic solvent, colorant and water as well as neutralizing agent, if required.

Step (2): Removing the organic solvent from the resultant dispersion.

In the step (1), first, the water-insoluble polymer is dissolved in the organic solvent, and then the colorant and water together with optional components such as neutralizing agent and surfactant, if required, are added and mixed in the resultant organic solvent solution to obtain a dispersion of an oil-in-water type. The content of the colorant in the mixture is preferably from 5 to 50% by weight. The content of the organic solvent in the mixture is preferably from 10 to 70% by weight. The content of the water-insoluble polymer in the mixture is preferably from 2 to 40% by weight, and the content of water in the mixture is preferably from 10 to 70% by weight. The water-insoluble polymer containing a salt-forming group is preferably neutralized with a neutralizing agent. The degree of neutralization of the salt-forming group in the polymer is not particularly limited. In general, the degree of neutralization is preferably controlled such that the finally obtained water dispersion exhibits a neutral liquid property, for example, a pH of 4.5 to 10. The pH of the dispersion may also be determined from a desired degree of neutralization for the water-insoluble polymer.

Examples of the preferred organic solvents include alcohol solvents, ketone solvents and ether solvents, i.e., the organic solvents are preferably those having a solubility in water of 50% by weight or lower but 10% by weight or higher as measured at 20° C.

Examples of the alcohol solvents include ethanol, isopropanol, n-butanol, tertiary butanol, isobutanol and diacetone alcohol. Examples of the ketone solvents include acetone, methyl ethyl ketone, diethyl ketone and methyl isobutyl ketone. Examples of the ether solvents include dibutyl ether, tetrahydrofuran and dioxane. Among these solvents, preferred are isopropanol, acetone and methyl ethyl ketone, and more preferred is methyl ethyl ketone. These solvents may be used alone or in the form of a mixture of any two or more thereof.

As the neutralizing agent, acids or bases may be selectively used according to the kind of salt-forming group contained in the water-insoluble polymer.

Specific examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine and triethanolamine.

The method for dispersing the mixture used in the step (1) is not particularly limited. Preferably, the mixture is first subjected to preliminary dispersion procedure, and then to the substantial dispersion procedure by applying a shear stress thereto. In the step (2), the solids contained in the dispersion are finely divided so as to produce the water-insoluble polymer particles having a desired average particle size.

Upon subjecting the mixture to the preliminary dispersion procedure, there may be used ordinary mixing or stirring devices such as anchor blades. Examples of the preferred mixing or stirring devices include high-speed mixers or stirrers such as "Ultra Disper" (tradename: available from Asada Tekko Co., Ltd.), "Ebara Milder" (tradename: available from Ebara Seisakusho Co., Ltd.), "TK Homomixer", "TK Pipeline Mixer", "TK Homo Jetter", "TK Homomic Line Flow" and "Filmix" (tradenames: all available from Tokushu Kika Kogyo Co., Ltd.), "Clearmix" (tradename: available from M-Technic Co., Ltd.) and "K.D. Mill" (tradename: available from Kinetics Dispersion Inc.).

To apply the shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename: available from Izumi Food Machinery Co., Ltd.) and "Mini-Labo 8.3H Model" (tradename: available from Rannie Corp.), and chamber-type high-pressure homogenizers such as "Micro Fluidizer" (tradename: available from Microfluidics Inc.), "Nanomizer" (tradename: available from Nanomizer Co., Ltd.), "Altimizer" (tradename: available from Sugino Machine Co., Ltd.), "Genus PY" (tradename: available from Hakusui Kagaku Co., Ltd.) and "DeBEE 2000" (tradename: Nippon BEE Co., Ltd.). Among these apparatuses, the high-pressure homogenizers are preferred in view of reducing a particle size of the pigment contained in the mixture.

In the step (2), the organic solvent is removed by distillation from the dispersion thus obtained in the above step (1) to render the dispersion aqueous or water-based, thereby obtaining a water dispersion of the colorant-containing water-insoluble polymer particles having a desired average particle size. The removal of the organic solvent from the water dispersion may be performed by an ordinary method such as distillation under reduced pressure. The organic solvent is substantially completely removed from the thus obtained water dispersion of the water-insoluble polymer particles. The content of the residual organic solvent in the water dispersion is usually 0.1% by weight or lower and preferably 0.01% by weight or lower. Further, the thus obtained water dispersion of the water-insoluble polymer particles is preferably passed through a filter to remove coarse particles therefrom. Although such coarse particles are usually not present or present only in a very small amount, in order to prevent clogging of nozzles in a printer, the mesh size of the filter is preferably from 1 to 10 μm and more preferably from 3 to 7 μm.

In the above water dispersion of the colorant-containing water-insoluble polymer particles, solid components made of the colorant-containing water-insoluble polymer are dispersed in water as a main solvent. The configuration of the colorant-containing water-insoluble polymer particles is not particularly limited as long as the particles are formed from at least the colorant and the water-insoluble polymer. Examples of the configuration of the colorant-containing water-insoluble polymer particles include the particle configuration in which the colorant is enclosed in the respective water-insoluble polymer particles, the particle configuration in which the colorant is uniformly dispersed in the respective water-insoluble polymer particles, and the particle configuration in which the colorant is exposed onto a surface of the respective water-insoluble polymer particles.

The average particle size of the colorant-containing water-insoluble polymer particles is preferably from 50 to 200 nm, more preferably from 70 to 170 nm and still more preferably from 90 to 150 nm in view of good dispersion stability and ejection property. The colorant-containing water-insoluble polymer particles have D90 (cumulative 90% value in frequency distribution of scattering intensity when the cumulative percentage is calculated sequentially from smaller particles) of preferably 350 nm or less, more preferably 300 nm or less and still more preferably 270 nm or less, in view of less content of coarse particles and enhanced storage stability of the water dispersion. The lower limit of D90 of the colorant-containing water-insoluble polymer particles is preferably 100 nm or more in view of facilitated production of the colorant-containing water-insoluble polymer particles. The colorant-containing water-insoluble polymer particles have D10 (cumulative 10% value in frequency distribution of scattering intensity when the cumulative percentage is calculated sequentially from smaller particles) of preferably 10 nm or more, more preferably 20 nm or more and still more preferably 30 nm or more, in view of good optical density and facilitated production of the colorant-containing water-insoluble polymer particles.

The average particle size, D90 and D10 may be measured using a laser particle analyzing system "ELS-8000" (cumulant analysis) available from Otsuka Denshi Co., Ltd. The measurement is conducted at a temperature of 25° C., an angle between incident light and detector of 90° and a cumulative frequency of 100 times, and a refractive index of water (1.333) is input to the analyzing system as a refractive index of the dispersing medium. The concentration of the water dispersion to be measured is usually about $5 \times 10^{-3}$% by weight.

Water Dispersion and Water-Based Ink for Ink-Jet Printing

The water-based ink of the present invention is an ink containing the water dispersion of the present invention, i.e., containing water as a main dispersing medium, and may further contain, if required, various additives such as wetting agents, dispersants, defoaming agents, mildew-proof agents and chelating agents. The method of mixing the respective components is not particularly limited.

In the water dispersions and water-based inks for ink-jet printing according to the first and second preferred embodiments of the present invention, the contents of the respective components are as follows.

In the water dispersion for ink-jet printing according to the first preferred embodiment of the present invention and in the water-based ink containing the water dispersion, the content of the nonionic organic compound is preferably 0.1% by weight or more, more preferably from 0.3% by weight or more and still more preferably 0.5% by weight or more. The upper limit of the content of the nonionic organic compound is preferably 3.0% by weight or less, more preferably 2.0% by weight or less and still more preferably 1.5% or less. From these viewpoints, the content of the nonionic organic compound is preferably from 0.1 to 3.0% by weight, more preferably 0.3 to 2.0% by weight and still more preferably from 0.5 to 1.5% by weight.

In the water dispersion for ink-jet printing according to the second preferred embodiment of the present invention and in the water-based ink containing the water dispersion, the total content of (1) the alkane diol compound having 8 to 30 carbon atoms and containing hydroxyl groups respectively bonded to adjacent carbon atoms thereof (2) the fatty acid monoglyceride having 8 to 30 carbon atoms; and (3) the monoalkyl glyceryl ether having 8 to 30 carbon atoms is preferably 0.1% by weight or more, more preferably 0.3% by weight or more and still more preferably 0.5% by weight or more. The upper limit of the total content of the compounds (1) to (3) is preferably 3.0% by weight or less, more preferably 2.0% by weight or less and still more preferably 1.5% by weight or less. From these viewpoints, the total content of the compounds (1) to (3) is preferably in the range of from 0.1 to 3.0% by weight, more preferably from 0.3 to 2.0% by weight and still more preferably from 0.5 to 1.5% by weight.

In the water dispersions according to the first and second preferred embodiments of the present invention (hereinafter respectively referred to merely as "water dispersion"), the content (solid content) of the colorant-containing water-insoluble polymer particles is preferably controlled to the range of from 5 to 35% by weight and more preferably from 10 to 25% by weight in view of a good optical density and a good ejection stability. In the water-based ink containing the water dispersion of the present invention, the content (solid content) of the colorant-containing water-insoluble polymer particles is preferably from 0.5 to 20% by weight and more preferably from 1 to 15% by weight.

In the water dispersion according to the first preferred embodiment of the present invention and the water-based ink containing the water dispersion, the weight ratio of the nonionic organic compound to the water-insoluble polymer (content of the nonionic organic compound/content of the water-insoluble polymer) is preferably from 1/10 to 2/1 and more preferably from 1/5 to 3/2 in order to readily spread the colorant-containing water-insoluble polymer particles over a printing paper.

In the water dispersion according to the second preferred embodiment of the present invention, the weight ratio of a sum of (1) the alkane diol compound having 8 to 30 carbon atoms and containing hydroxyl groups respectively bonded to adjacent carbon atoms thereof, (2) the fatty acid monoglyceride having 8 to 30 carbon atoms and (3) the monoalkyl glyceryl ether having 8 to 30 carbon atoms to the water-insoluble polymer (total content of the compounds (1), (2) and (3)/content of the water-insoluble polymer) is preferably from 1/10 to 2/1 and more preferably from 1/5 to 3/2 in order to readily spread the colorant-containing water-insoluble polymer particles over a printing paper.

The content of water in the water dispersion and the water-based ink of the present invention is preferably from 30 to 90% by weight and more preferably from 40 to 80% by weight.

According to the above inventors' knowledge, in order to allow the colorant to remain attached on the printing paper, the water-based ink may be enhanced in wettability and spreadability on a surface of the printing paper to prevent the water-based ink from penetrating to an inside of the paper. Therefore, the water-based ink of the present invention preferably has the relationship between a surface tension ($\gamma$) and a contact angle ($\theta$) thereof measured by the below-mentioned methods which satisfies the following formulae (1) and (2) in order to achieve a high optical density.

$$10.0 \leq \gamma \cos \theta \leq 27.0 \quad (1)$$

$$0.2 \leq \gamma(1-\cos \theta) \leq 1.3 \quad (2)$$

The surface tension ($\gamma$) and the contact angle ($\theta$) may be measured by the methods described in Examples hereunder.

As a fundamental formula of liquid penetration, there is generally known the following Lucas-Washburn formula:

$$l = (r\gamma \cos \theta t/2\eta)^{1/2}$$

wherein I is a penetration velocity; t is a time; η is a viscosity; γ is a surface tension; and θ is a contact angle.

The value "γ cos θ" is a factor governing the penetration velocity (penetration depth) of liquid in the Lucas-Washburn formula. The smaller the value "γ cos θ", the lower the penetration velocity becomes. More specifically, as the value "γ cos θ" becomes smaller, penetration of an ink into a paper is more shallow and an optical density of the printed images is enhanced. Therefore, in view of lowering the penetration velocity and decreasing the value of the formula (2), the value "γ cos θ" is preferably 27.0 or less, more preferably 26.7 or less, still more preferably 26.0 or less, further still more preferably 25.0 or less and most preferably 24.8 or less. The lower limit of the value "γ cos θ" is preferably 15.0 or more, more preferably 20.0 or more, still more preferably 22.0 or more, further still more preferably 23.0 or more, further still more preferably 23.5 or more and most preferably 24.0 or more. From these viewpoints, the value "γ cos θ" is preferably in the range of from 15.0 to 27.0, more preferably from 20.0 to 27.0, still more preferably from 22.0 to 26.7, further still more preferably from 23.5 to 26.7, further still more preferably from 23.5 to 25.0, further still more preferably from 23.5 to 24.8 and most preferably from 24.0 to 24.8.

It is also known that an amount of spread-wetting work of liquid is represented by the following Young formula;

$$W_{SP} = \gamma(1 - \cos\theta)$$

wherein $W_{SP}$ is an amount of work; γ is a surface tension; and θ is a contact angle.

The value "γ(1−cos θ)" corresponds to an amount of wetting work ($W_{SP}$) when a surface of a paper is wetted with the water-based ink. The smaller the value "γ(1−cos θ)", the more effectively the ink wets a surface of the paper. More specifically, as the $W_{SP}$ value becomes smaller, the ink spread over a broader surface of the paper, resulting in enhancement in optical density. Therefore, in view of facilitated wetting and spreading of the ink, the value "γ(1−cos θ)" is preferably 1.3 or less, more preferably 1.1 or less and still more preferably 1.03 or less. The lower limit of the value "γ(1−cos θ)" is preferably 0.1 or more, more preferably 0.2 or more, still more preferably 0.3 or more and most preferably 0.45 or more. From these viewpoints, the $W_{SP}$ value is preferably in the range of from 0.1 to 1.3, more preferably from 0.2 to 1.3, still more preferably from 0.3 to 1.1, further still more preferably from 0.30 to 1.05 and most preferably from 0.45 to 1.05.

The surface tension γ is preferably lower in view of a high optical density as recognized from the formulae (1) and (2). Specifically, the surface tension γ is preferably 28.0 mN/m or less, more preferably 27.5 mN/m or less and still more preferably 27.0 mN/m or less as measured at 25° C. in view of a high optical density. The lower limit of the surface tension γ is preferably 20.0 mN/m or more. In order to achieve the surface tension γ within the above-specified range, a compound capable of lowering a surface tension may be added to the water-based ink.

The contact angle θ may be determined by well balanced relation between the formulae (1) and (2). In view of a high optical density, the contact angle θ is preferably from 8.0° to 18.0°, more preferably from 9.0° to 17.5° and still more preferably from 10.0° to 17.0°. In order to satisfy the contact angle in the above-specified range, a compound capable of reducing the surface tension and exhibiting a low solubility in the water-based ink may be added to the water-based ink.

Ink-Jet Printing Method

The water-based ink for ink-jet printing according to the present invention is suitably used for the ink-jet printing method in which ink-jet printing is performed in an one-pass printing manner. The one-pass printing means that in the case of a line head type ink-jet printer in which a scanning direction of the ink-jet head is consistent with a delivery direction of a printing medium, images are formed at one scanning operation, whereas in the case of a serial head type ink-jet printer in which scanning of the ink-jet head is carried out in two directions, images are formed while delivering a printing medium in a direction perpendicular to the scanning directions substantially without allowing an ink shot to impinge against the previous ink shot on the printing medium.

Upon the one-pass printing, the number of ink droplets injected from ink-jet nozzles per unit area is reduced. Therefore, the size of one ink droplet used in the one-pass printing is large as compared to printing methods using several passes. A large-dot ink droplet is fluctuated in an amount of ink per unit area as compared to several small-dot ink droplets. Therefore, there is present a very small portion on the printing paper where the amount of ink is large and therefore the ink tends to readily penetrate into the paper. On the contrary, the water-based ink of the present invention is promoted in wettability and spreadability over a surface of the printing paper and is prevented from penetrating to an inside of the paper. As a result, the water-based ink of the present invention is suitably used for the one-pass printing method.

EXAMPLES

In the following synthesis examples, production examples, examples and comparative examples, the "part(s)" and "%" indicate "part(s) by weight" and "% by weight", respectively, unless otherwise specified.

Synthesis Example 1

Twenty parts of methyl ethyl ketone and 0.03 part of a chain transfer agent (2-mercaptoethanol) together with 10% of 200 parts of a mixture of respective monomers shown in Table 1 below were charged into a reaction vessel and mixed with each other, and then the reaction vessel was fully purged with a nitrogen gas to thereby obtain a mixed solution.

Separately, remaining 90% of the monomer mixture shown in Table 1 was charged into a dropping funnel, and further 0.27 part of the chain transfer agent, 60 parts of methyl ethyl ketone and 1.2 parts of a radical polymerization initiator (2,2'-azobis(2,4-dimethyl valeronitrile)) were added thereto and mixed with each other, and the dropping funnel was fully purged with a nitrogen gas to thereby obtain a mixed solution.

The mixed solution in the reaction vessel was heated to 65° C. under stirring in a nitrogen atmosphere, and then the mixed solution in the dropping funnel was gradually dropped thereinto over 3 h. After the elapse of 2 h at 65° C. from completion of the dropping, a solution prepared by dissolving 0.3 part of the radical polymerization initiator in 5 parts of methyl ethyl ketone was added to the above obtained reaction solution, and the resultant solution was aged at 65° C. for 2 h and further at 70° C. for 2 h to obtain a polymer solution.

Meanwhile, details of the compounds shown in Table 1 are as follows.

Styrene macromer: "AS-6S" (tradename) available from Toagosei Co., Ltd.; number-average molecular weight: 6000; polymerizable functional group: methacryloyloxy group; purity: 50%

Polyethylene glycol monomethacrylate (molar number of addition of ethyleneoxide: 9 mol in average): "NK Ester M-90G" (tradename) available from Shin-Nakamura Kagaku Kogyo Co., Ltd.; terminal group: hydrogen atom Polypropylene glycol monomethacrylate (molar number of addition of propyleneoxide: 9 mol in average): "Blemmer PP-500" (tradename) available from NOF Corporation; terminal group: hydrogen atom

TABLE 1

| Kind of Monomer *1 | Synthesis Example 1 |
|---|---|
| (a) Methacrylic acid | 10 |
| (b) Styrene macromer | 15 |
| (c) Benzyl methacrylate | 40 |
| (c) Styrene monomer | 10 |
| (d) Polyethylene glycol monomethacrylate | 5 |
| (d) Polypropylene glycol monomethacrylate | 20 |
| Weight-average molecular weight | 200,000 |

Note:
*1: The numerals indicate effective contents (wt %) of the monomers.

Synthesis Example 2

The same procedure as in Synthesis Example 1 was repeated except for using a styrene monomer in place of (c) benzyl methacrylate shown in Table 1, thereby obtaining a polymer solution.

Production Example 1

Twenty five parts of the polymer produced by drying the polymer solution obtained in Synthesis Example 1 under reduced pressure was dissolved in 70 parts of methyl ethyl ketone. Further, 4.1 parts of a neutralizing agent (a 5N sodium hydroxide aqueous solution) and 230 parts of ion-exchanged water were added to the resultant solution to neutralize a salt-forming group of the polymer (degree of neutralization: 75%), and then 75 parts of a quinacridone pigment (C.I. Pigment Violet 19 "Hostaperm Red E5B02" (tradename) available from Clariant Japan Co., Ltd.) was added into the reaction solution and mixed with each other at 20° C. for 1 h using disper blades. The thus obtained mixture was dispersed under a pressure of 200 MPa by passing through a dispersing apparatus "MICROFLUIDIZER" (tradename) available from Microfluidics Corp., 10 times.

The resultant dispersion was mixed with 250 parts of ion-exchanged water under stirring, and then methyl ethyl ketone was removed from the resultant mixture under reduced pressure at 60° C., followed by further removing a part of water therefrom. The obtained mixture was filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion of pigment-containing vinyl polymer particles having a solid content of 20%. The average particle size of the thus obtained pigment-containing vinyl polymer particles was 110 nm.

Production Example 2

The same procedure as in Production Example 1 was repeated except for using the polymer solution obtained in Synthesis Example 2 in place of the polymer solution obtained in Synthesis Example 1, thereby obtaining a water dispersion of pigment-containing vinyl polymer particles having a solid content of 20%. The average particle size of the thus obtained pigment-containing vinyl polymer particles was 110 nm.

Example 1

Forty parts of the water dispersion of pigment-containing vinyl polymer particles produced in Production Example 1, 7 parts of triethylene glycol monobutyl ether, 1 part of "SURFYNOL 465" available from Nissin Chemical Industries, Co., Ltd., 0.3 part of "Ploxel XL2" available from Avecia KK, 1 part of 1,2-dodecanediol available from Tokyo Kasei Kogyo Co., Ltd., and 30 parts of ion-exchanged water were previously dissolved and dispersed to prepare solutions containing respective components, and then the solutions were mixed with each other. Further, glycerol and ion-exchanged water were added to the resultant mixture so as to control an E-type viscosity at 20° C. of the mixture to 4 mPa·s, followed by fully stirring to obtain a mixed solution having a total volume of 100 parts. The resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle to remove coarse particles therefrom, thereby obtaining a water-based ink.

Meanwhile, the measurement of the E-type viscosity was carried out at a temperature of 20° C. and a rotating speed of 100 rpm for 1 min by using a viscometer "RE80" available from Toki Sangyo Co., Ltd., and a standard rotor (1°34'× R24).

Examples 2 to 7

The same procedure as in Example 1 was repeated except for using the compound shown in Table 2 in place of 1,2-dodecanediol, thereby obtaining a water-based ink.

Example 8

The same procedure as in Example 1 was repeated except for using 40 parts of the water dispersion of pigment-containing vinyl polymer particles as produced in Production Example 2 in place of 40 parts of the water dispersion of pigment-containing vinyl polymer particles as produced in Production Example 1, thereby obtaining a water-based ink.

Comparative Examples 1 and 2

The same procedure as in Example 1 was repeated except for using the compound shown in Table 2 in place of 1,2-dodecanediol, thereby obtaining a water-based ink.

Comparative Example 3

The same procedure as in Example 1 was repeated except for using no 1,2-dodecanediol and using water instead in an amount corresponding to that of 1,2-dodecanediol, thereby obtaining a water-based ink.

Properties of the water-based inks obtained in Examples 1 to 8 and Comparative Examples 1 to 3 were evaluated by the following methods. Also, properties of the nonionic organic compounds were determined by the following methods. The results are shown in Table 2.

(1) Optical Density

Solid image printing was carried out on a plain paper "4024" (tradename) commercially available from Xerox Corp., using an ink-jet printer "Model EM930C" (piezoelectric type) available from Seiko Epson Co., Ltd., under the following printing conditions:

Kind of Paper: Plain Paper
Mode set: Fine (one pass).

After allowing the printed paper to stand at 25° C. for 24 h, the optical density thereof was measured at 5 points including a center point and 4 corner points on the printed paper (5.1 cm×8.0 cm) using a Macbeth densitometer "RD914" (product number) available from Gretag-Macbeth Corp., to calculate an average of the measured values.

(2) Gloss

Solid image printing was carried out on a coated paper (photographic paper <glossy> "KA450PSK (tradename)" having a 20° gloss of 21 which was available from Seiko Epson Co., Ltd., using the above ink-jet printer under the following printing conditions:

Kind of Paper: Photo Printing Paper (coated paper)
Mode set: Photo (four passes).

After allowing the printed paper to stand at 25° C. for 24 h, the 20° gloss thereof was measured 5 times at 25° C. using a glossmeter "HANDY GLOSSMETER" (tradename; product number: PG-1) available from Nippon Denshoku Industries Co., Ltd., to calculate an average of the measured values.

(3) Method of Measuring Solubility of Nonionic Organic Compound

A predetermined amount of the nonionic organic compound was sampled at room temperature (25° C.), and ion-exchanged water at 25° C. was added under stirring (about 100 rpm) to the nonionic organic compound to observe and confirm complete dissolution of the nonionic organic compound therein (colorless transparent condition of the aqueous solution) by naked eyes, thereby determining a solubility of the nonionic organic compound in water. The solubility is expressed by a saturated solubility of the nonionic organic compound in 100 g of water. The stirring for the measurement was conducted within 1 h.

(4) Method of Measuring Surface Tension of Water Containing Nonionic Organic Compound A platinum plate was immersed in five grams of an aqueous solution prepared by dissolving 0.001 g of the nonionic organic compound in 100 g of water which was filled in a cylindrical polyethylene container (3.6 cm in diameter×1.2 cm in depth). Then, using a surface tension meter "CBVP-2" (tradename) available from Kyowa Interface Science Co., Ltd., a surface tension of the aqueous solution, i.e., water containing the nonionic organic compound, was measured at 25° C. When the amount of the nonionic organic compound dissolved in 100 g of water was less than 0.001 g, the surface tension thereof was measured at a maximum solubility thereof.

TABLE 2

| | Nonionic organic compound | Optical density | Gloss | Surface tension (mN/m) | Solubility (g/100 g) |
|---|---|---|---|---|---|
| Example 1 | 1,2-dodecanediol | 1.01 | 67 | 47.1 | 0.001 |
| Example 2 | 1,2-decanediol | 0.99 | 70 | 55 | 0.055 |
| Example 3 | 1,2-octanediol | 0.96 | 60 | 65 | 0.2 |
| Example 4 | 2-ethylhexyl monoglyceryl ether | 0.96 | 48 | 62 | 0.15 |
| Example 5 | Isodecyl monoglyceryl ether | 0.99 | 57 | 57.8 | 0.05 |
| Example 6 | Decanoic acid monogriceride | 0.96 | 50 | 65 | 0.15 |
| Example 7 | Lauric acid monogriceride | 0.96 | 45 | 63 | 0.12 |
| Example 8 | 1,2-dodecanediol | 1.03 | 54 | 47.1 | 0.001 |
| Comparative Example 1 | 1,2-hexanediol | 0.92 | 47 | 71.2 | ≧6 |
| Comparative Example 2 | 1,8-octanediol | 0.92 | 35 | 70.7 | 1 |
| Comparative Example 3 | None | 0.92 | 32 | 71.8 | — |

From the results shown in Table 2, it was confirmed that all of the water-based inks for ink-jet printing obtained in Examples 1 to 8 were excellent in optical density upon printing on a plain paper as compared to those obtained in Comparative Examples 1 to 3, and further the water-based ink obtained in Example 1 exhibited a higher gloss upon printing on a coated paper as composed to the water-based ink obtained in Example 8.

In addition, from the results shown in FIGS. 1 and 2, it was confirmed that the solubility of the nonionic organic compound in 100 g of water as measured at 25° C. was 0.30 g or less, and the surface tension of water containing 0.001% by weight of the nonionic organic compound as measured at 25° C. was 70 mN/m or less. This showed that the inks obtained according to the present invention had a high optical density.

Comparative Examples 4 to 6

The same procedure as in Example 1 was repeated except for using the compound shown in Table 3-1 in place of 1,2-dodecanediol, thereby obtaining a water-based ink.

The surface tension γ and the contact angle θ of the respective water-based inks obtained in Examples 1 to 7 and Comparative Examples 1 to 6 were measured by the following methods to calculate the values γ cos θ and γ(1−cos θ). Also, the optical density of the respective water-based inks was measured by the above method. The results are shown in Tables 3-1 and 3-2.

Method of Measuring Surface Tension (γ) of Water-Based Ink:

Using a surface tension meter "CBVP-2" (tradename) available from Kyowa Interface Science Co., Ltd., a platinum plate was immersed in 5 g of the water-based ink filled in a cylindrical polyethylene container (3.6 cm in diameter×1.2 cm in depth) to measure a surface tension of the water-based ink at 25° C.

Method of Measuring Contact Angle (θ) of Water-Based Ink:

Using a static contact angle meter "CA-A" (tradename) (using a capillary having an inner diameter of 0.4 mm) available from Kyowa Interface Science Co., Ltd., about 2.4 μL g of the water-based ink was contacted with a recording medium (plain paper "4024" (tradename) available from Xerox Corp.), and after the elapse of 15 s from the contact, a contact angle of the ink droplet on the recording medium was measured at 25° C.

TABLE 3-1

| | Nonionic organic compound | Optical density | Surface tension (mN/m) |
|---|---|---|---|
| Example 1 | 1,2-dodecanediol | 1.01 | 24.9 |
| Example 2 | 1,2-decanediol | 0.99 | 24.4 |
| Example 3 | 1,2-octanediol | 0.96 | 25.5 |
| Example 4 | 2-ethylhexyl monoglyceryl ether | 0.96 | 26.4 |
| Example 5 | Isodecyl monoglyceryl ether | 0.99 | 25.5 |
| Example 6 | Decanoic acid monogriceride | 0.96 | 27 |
| Example 7 | Lauric acid monogriceride | 0.96 | 27.4 |

TABLE 3-1-continued

|  | Nonionic organic compound | Optical density | Surface tension (mN/m) |
|---|---|---|---|
| Comparative Example 1 | 1,2-hexanediol | 0.92 | 28 |
| Comparative Example 2 | 1,8-octanediol | 0.92 | 29.4 |
| Comparative Example 3 | None (Blank) | 0.92 | 29.1 |
| Comparative Example 4 | Coconut oil fatty acid diethanol amide *1 | 0.92 | 28.2 |
| Comparative Example 5 | Coconut oil fatty acid N-methyl ethanol amide *2 | 0.93 | 28.2 |
| Comparative Example 6 | Polyoxyethylene coconut oil fatty acid monoethanol amide *3 | 0.93 | 28.8 |

TABLE 3-2

|  | Contact angle (°) | γcosθ | γ(1 − cosθ) |
|---|---|---|---|
| Example 1 | 14.7 | 24.1 | 0.82 |
| Example 2 | 11.9 | 23.9 | 0.52 |
| Example 3 | 11.1 | 25.0 | 0.48 |
| Example 4 | 16.4 | 25.3 | 1.07 |
| Example 5 | 16.2 | 24.5 | 1.01 |
| Example 6 | 13.9 | 26.2 | 0.79 |
| Example 7 | 15.5 | 26.4 | 1.00 |
| Comparative Example 1 | 15 | 27.2 | 0.95 |
| Comparative Example 2 | 15.1 | 28.4 | 1.02 |
| Comparative Example 3 | 14.5 | 28.2 | 0.93 |
| Comparative Example 4 | 16.2 | 27.1 | 1.12 |
| Comparative Example 5 | 14.4 | 27.3 | 0.89 |
| Comparative Example 6 | 17.1 | 27.5 | 1.27 |

Note:
*1: Coconut oil fatty acid diethanol amide: "AMIZOL CDE" (tradename) available from Kawaken Fine Chemical Co., Ltd.
*2: Coconut oil fatty acid N-methyl ethanol amide: "AMINONE C11S" (tradename) available from Kao Corp.
*3: Polyoxyethylene coconut oil fatty acid monoethanol amide (molar number of addition of ethyleneoxide: 5 mol in average): "AMIZETT 5C" (tradename) available from Kawaken Fine Chemical Co., Ltd.

Figure 3:
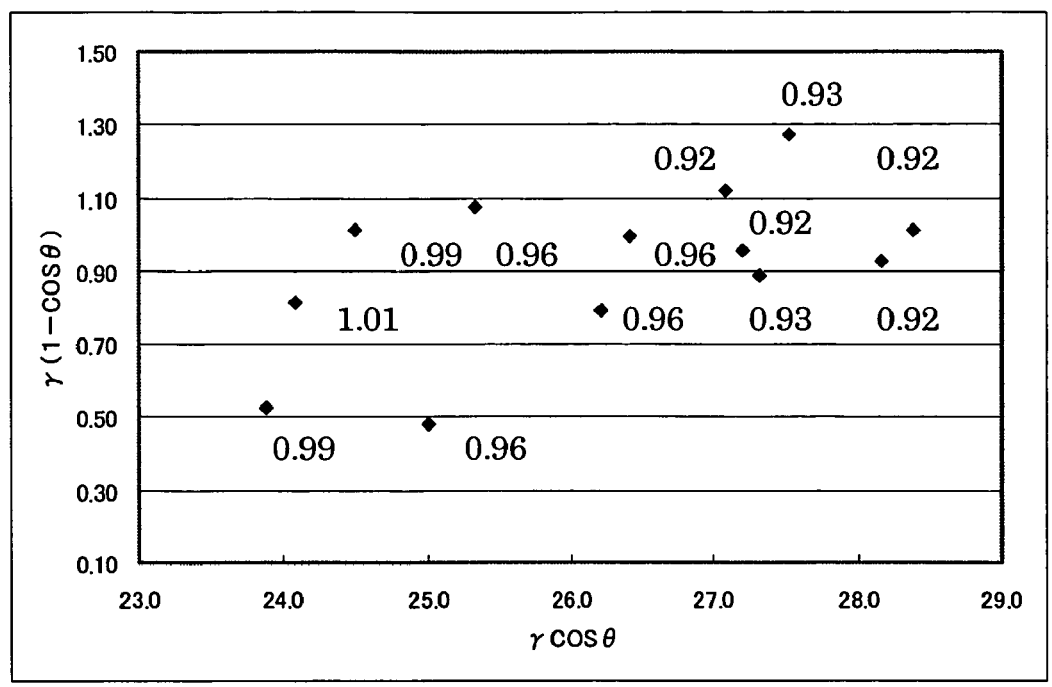
FIG. 3 is a plotting view of $\gamma \cos \theta$ and $\gamma(1-\cos \theta)$ of the water-based inks obtained in Examples 1 to 7 and Comparative Examples 1 to 6 in which numerical values represent optical densities of the respective inks.

From the results shown in Tables 3-1 and 3-2 and FIG. 3, it was confirmed that the water-based inks having a value "γ cos θ" of 10.0 to 27.0 and a value "γ(1−cos θ)" of 0.20 to 1.30 provided prints having a high optical density even when printing on a plain paper.

Standard Test and Method of Measuring Average Penetration Depth

Using the following standard ink and a printer available from Seiko Epson Corp., (tradename: "EM-930C"; nozzle diameter: φ38 μm; resolution: 360 dpi; ejection frequency: 14.4 kHz; printing mode: "Fine"; printing speed: 9.2 ppm; amount of ink droplet: 40 pl), solid image printing (100% Duty solid printing) is carried out on an plain paper (tradename: "4024" available from Xerox Corp.) under the following printing conditions:

Kind of Paper: Plain Paper
Mode set: Fine (one pass).

The thus obtained paper was allowed to stand at 25° C. for 24 h, and a solid-printed portion thereof was cut out using a cutter to measure a penetration depth of the pigment at optional 10 positions on a cut section of the paper using an extra-depth profile measuring microscope "VK-8500" available from Keyence Co., Ltd., and the average penetration depth was calculated from the measured values.

Standard Ink

The ink having the following blending composition was used as the standard ink. Meanwhile, the amounts blended were calculated in terms of pure substance contents of the respective components.

A mixture obtained by blending 7.47 parts by weight of quinacridone pigment-containing vinyl polymer particles obtained in Production Example 1 having an average particle size of 110 nm (D10: 70 nm; D90: 171 nm) (average particle size: 110 nm; polymer/pigment: 25 parts/75 parts; polymer composition: methacrylic acid/styrene macromer/benzyl methacrylate/styrene monomer/polyethylene glycol monomethacrylate/polypropylene glycol methacrylate=10/15/40/10/5/20; 75% neutralized product neutralized with sodium hydroxide), 10 parts by weight of 2-pyrrolidone, 1 part by weight of "SURFYNOL 465" available from Nissin Chemical Industries, Co., Ltd., and 1 parts by weight of the nonionic organic compound with each other, was mixed with glycerol and water to prepare 100 parts by weight in total of a solution having an E-type viscosity of 4 mPa·s as measured at 20° C. using a viscometer "RE80" available from Toki Sangyo Co., Ltd. Thereafter, the obtained solution was filtered through a 1.2 μm-mesh filter (acetyl cellulose membrane; outer diameter: 2.5 cm; available from Fuji Photo Film Co., Ltd.) fitted to a 25 mL syringe without a needle to remove coarse particles therefrom.

(Results of Measurement of Average Penetration Depth)

It was confirmed that when 1,2-dodecanediol (Example 1), Isodecyl monoglyceryl ether (Example 5) was used as the nonionic organic compound, the average penetration depth of the pigment was respectively 45 μm, 51 μm, whereas when Coconut oil fatty acid diethanolamide (Comparative Example 4) was used, the average penetration depth of the pigment was 68 cm and nonionic organic compound was not used and an increased amount of ion-exchanged water was used instead, the average penetration depth of the pigment was 77 μm.

The water-based ink containing the water dispersion for ink-jet printing according to the present invention can exhibit a high optical density even upon printing on a plain paper by an one-pass printing method, as well as a good gloss upon printing on a coated paper.

What is claimed is:

1. A water dispersion for ink jet printing, comprising water-insoluble polymer particles containing a colorant, and a nonionic organic compound satisfying the following conditions I and II:

I: Water containing 0.001% by weight of the nonionic organic compound has a surface tension of 70 mN/m or less as measured at 25° C.; and II: A solubility of the nonionic organic compound in 100 g of water is 0.30 g or less as measured at 25° C., wherein the nonionic organic compound is 2-ethylhexyl glyceryl ether and/or isodecyl glyceryl ether;

wherein a content of the nonionic organic compound in the water dispersion is from 0.3 to 2.0% by weight; and wherein the water-insoluble polymer is a graft polymer which contains a constitutional unit derived from polypropylene glycol mono(meth)acrylate represented by the following formula:

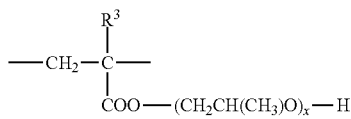

wherein $R^3$ is a hydrogen atom or a methyl group, and x is a number from 1 to 30.

2. The water dispersion for ink-jet printing according to claim 1, wherein the water-insoluble polymer contains a constitutional unit represented by the following formula (1):

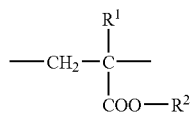 (1)

wherein $R^1$ is a hydrogen atom or a methyl group, and $R^2$ is a substituted or unsubstituted arylalkyl group having 7 to 22 carbon atoms or a substituted or unsubstituted aryl group having 6 to 22 carbon atoms.

3. The water dispersion for ink-jet printing according to claim 1, wherein the water-insoluble polymer contains a constitutional unit represented by the following formula (1) in an amount of 20 to 80% by weight:

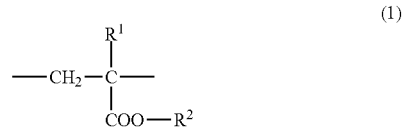 (1)

wherein $R^1$ is a hydrogen atom or a methyl group, and $R^2$ is a substituted or unsubstituted arylalkyl group having 7 to 22 carbon atoms or a substituted or unsubstituted aryl group having 6 to 22 carbon atoms.

4. The water dispersion for ink-jet printing according to claim 1, wherein a content of the nonionic organic compound in the water dispersion is from 0.5 to 1.5% by weight.

5. A water-based ink for ink jet printing, comprising the water dispersion for ink-jet printing as defined in claim 1.

* * * * *